US010112783B2

United States Patent
Stauber

(10) Patent No.: US 10,112,783 B2
(45) Date of Patent: Oct. 30, 2018

(54) TRANSFER DEVICE FOR PRODUCT CARRIERS WITH HOLDING MEANS

(71) Applicant: FERAG AG, Hinwil (CH)

(72) Inventor: Erwin Stauber, Grüt (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 15/797,917

(22) Filed: Oct. 30, 2017

(65) Prior Publication Data
US 2018/0118471 A1    May 3, 2018

(30) Foreign Application Priority Data

Nov. 1, 2016   (CH) ........................... 1458/16
Mar. 28, 2017  (CH) ........................... 413/17

(51) Int. Cl.
| | |
|---|---|
| B65G 47/61 | (2006.01) |
| B65G 33/02 | (2006.01) |
| B65G 47/82 | (2006.01) |
| B65G 47/28 | (2006.01) |
| B65G 33/26 | (2006.01) |
| B65G 9/00  | (2006.01) |

(52) U.S. Cl.
CPC ............. *B65G 47/61* (2013.01); *B65G 9/004* (2013.01); *B65G 33/02* (2013.01); *B65G 33/265* (2013.01); *B65G 47/28* (2013.01); *B65G 47/82* (2013.01); *B65G 2201/0229* (2013.01)

(58) Field of Classification Search
CPC ........ B65G 9/004; B65G 9/008; B65G 19/02; B65G 33/02; B65G 33/265; B65G 47/28; B65G 47/61; B65G 47/82; B65G 2201/0229

USPC ............ 198/459.3, 495.4, 465.4, 467.1, 680
See application file for complete search history.

(56) References Cited

U.S. PATENT DOCUMENTS

| | | | |
|---|---|---|---|
| 474,973 A | 5/1892 | Sadd | |
| 3,694,018 A | 9/1972 | Levering | |
| 3,982,623 A | 9/1976 | Depas et al. | |
| 4,946,023 A | 8/1990 | Heinold et al. | |
| 5,269,402 A * | 12/1993 | Speckhart ............... | B65G 33/02 198/416 |

(Continued)

FOREIGN PATENT DOCUMENTS

| | | |
|---|---|---|
| CH | 710 022 A1 | 2/2016 |
| DE | 247498 C | 1/1911 |

(Continued)

OTHER PUBLICATIONS

Co-pending U.S. Appl. No. 15/553,469, "Feeding Device of an Intra-Logistics System," filed Aug. 24, 2017.

(Continued)

*Primary Examiner* — Gene O Crawford
*Assistant Examiner* — Keith R Campbell
(74) *Attorney, Agent, or Firm* — Pauley Erickson & Kottis

(57) ABSTRACT

A transfer device (1) for the separated transfer of product carriers (2a-2e) with holders (21, 21a-21e) to an overhead conveyor is described, comprising a helical conveyor (11), which defines a conveying section (F) for the holders (21, 21a-21e) with a conveying portion (FF) and a transfer portion (FU), wherein the conveying section (F) in the conveying portion (FF) describes a linear path and in the transfer portion (FU) describes a transversely curved path superimposed on the linear path.

19 Claims, 10 Drawing Sheets

(56) References Cited

U.S. PATENT DOCUMENTS

| | | | |
|---|---|---|---|
| 5,280,895 A | 1/1994 | Meier | |
| 5,647,475 A * | 7/1997 | Gaertner | B65G 33/02 198/370.1 |
| 5,788,054 A * | 8/1998 | Janzen | B65G 33/02 198/459.3 |
| 5,975,279 A * | 11/1999 | Blattner | B65G 33/02 198/459.4 |
| 6,003,859 A | 12/1999 | Reist | |
| 6,139,252 A | 10/2000 | Honegger | |
| 6,199,682 B1 * | 3/2001 | Matkovich | B07C 5/02 198/465.4 |
| 6,415,907 B1 * | 7/2002 | Matkovich | B65G 47/61 198/465.4 |
| 6,971,501 B2 * | 12/2005 | Beyer | B65G 33/02 198/459.3 |
| 2009/0263226 A1 | 10/2009 | Ramsey | |
| 2017/0341864 A1 | 11/2017 | Stauber | |

FOREIGN PATENT DOCUMENTS

| | | |
|---|---|---|
| DE | 1 875 012 | 7/1963 |
| DE | 77 15 547 U1 | 8/1978 |
| DE | 29 02 724 A1 | 8/1980 |
| DE | 86 04 435 U1 | 4/1986 |
| DE | 38 19 102 C1 | 10/1989 |
| DE | 41 17 991 A1 | 12/1992 |
| DE | 43 26 095 C1 | 1/1995 |
| DE | 19 82 9484 C1 | 11/1999 |
| DE | 20 2006 001 607 U1 | 7/2007 |
| DE | 10 2006 056 943 A1 | 6/2008 |
| DE | 10 2008 057 630 A1 | 5/2010 |
| DE | 10 2009 021 382 A1 | 11/2010 |
| DE | 10 2012 015 040 A1 | 5/2014 |
| EP | 0 511 159 A | 10/1992 |
| EP | 0 802 133 A2 | 10/1997 |
| EP | 0 827 929 A1 | 3/1998 |
| EP | 0 856 480 A1 | 8/1998 |
| EP | 1 299 298 B1 | 4/2000 |
| EP | 1 914 182 A1 | 4/2008 |
| EP | 2 107 023 A1 | 10/2009 |
| EP | 2 692 667 A1 | 2/2014 |
| EP | 2 784 009 A1 | 10/2014 |
| GB | 788799 A | 1/1958 |
| WO | WO 98/03419 A1 | 1/1998 |
| WO | WO 02/36474 A1 | 5/2002 |
| WO | WO 2013/159238 A1 | 10/2013 |
| WO | WO 2016/030274 A1 | 3/2016 |
| WO | WO 2016/030275 A1 | 3/2016 |

OTHER PUBLICATIONS

Co-pending U.S. Appl. No. 15/553,490, "Transport Unit of an Overhead Conveyor System, Having a Buffer Element," filed Aug. 24, 2017.

* cited by examiner

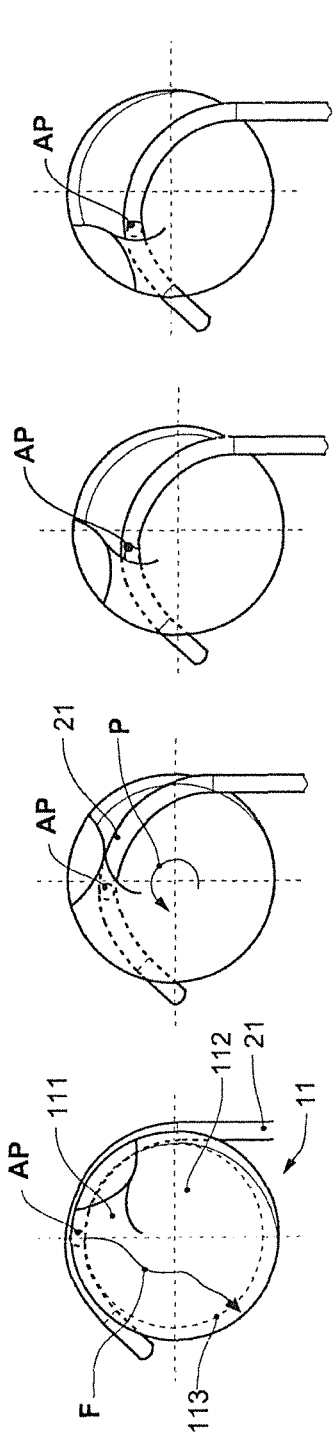

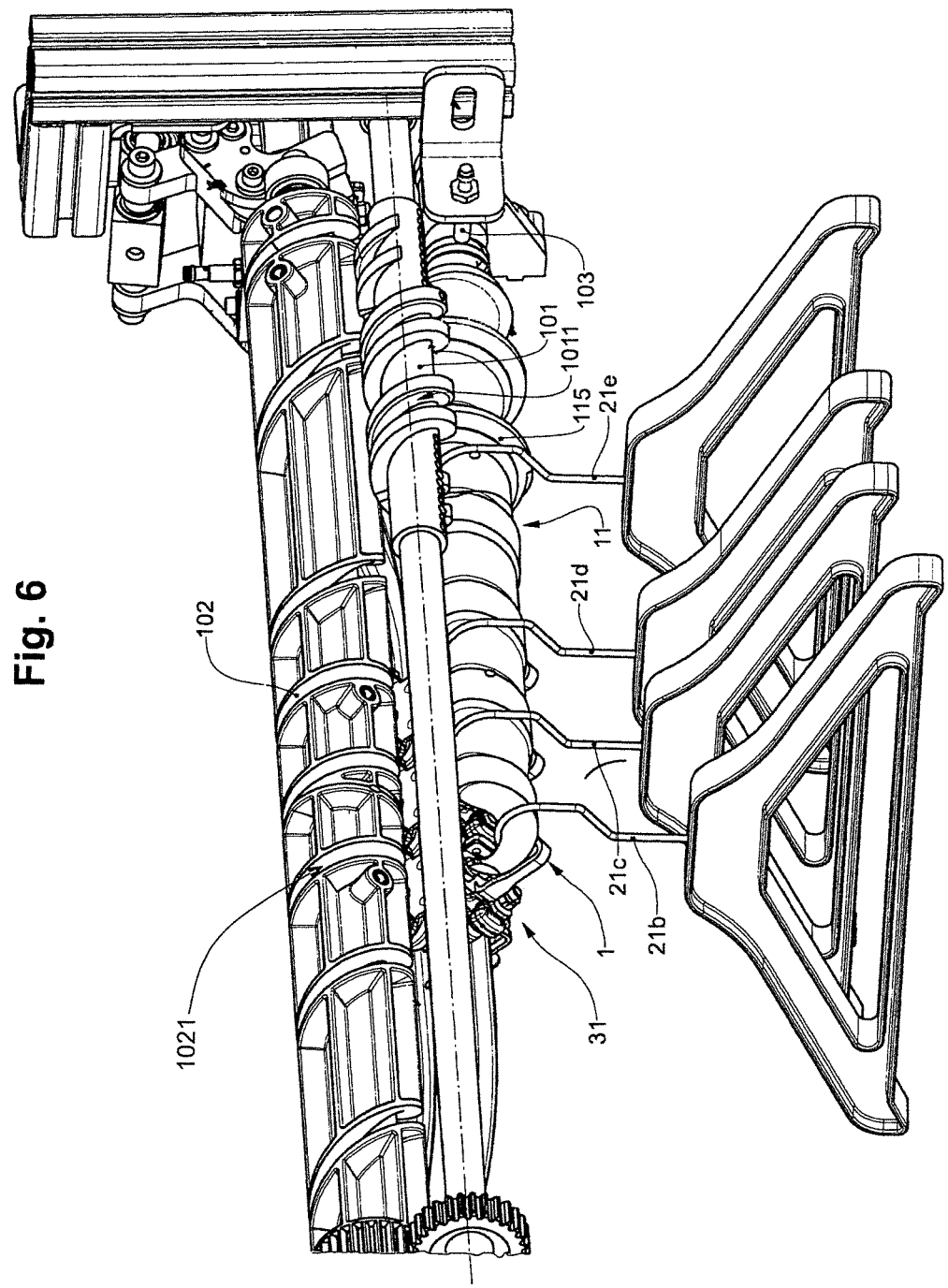

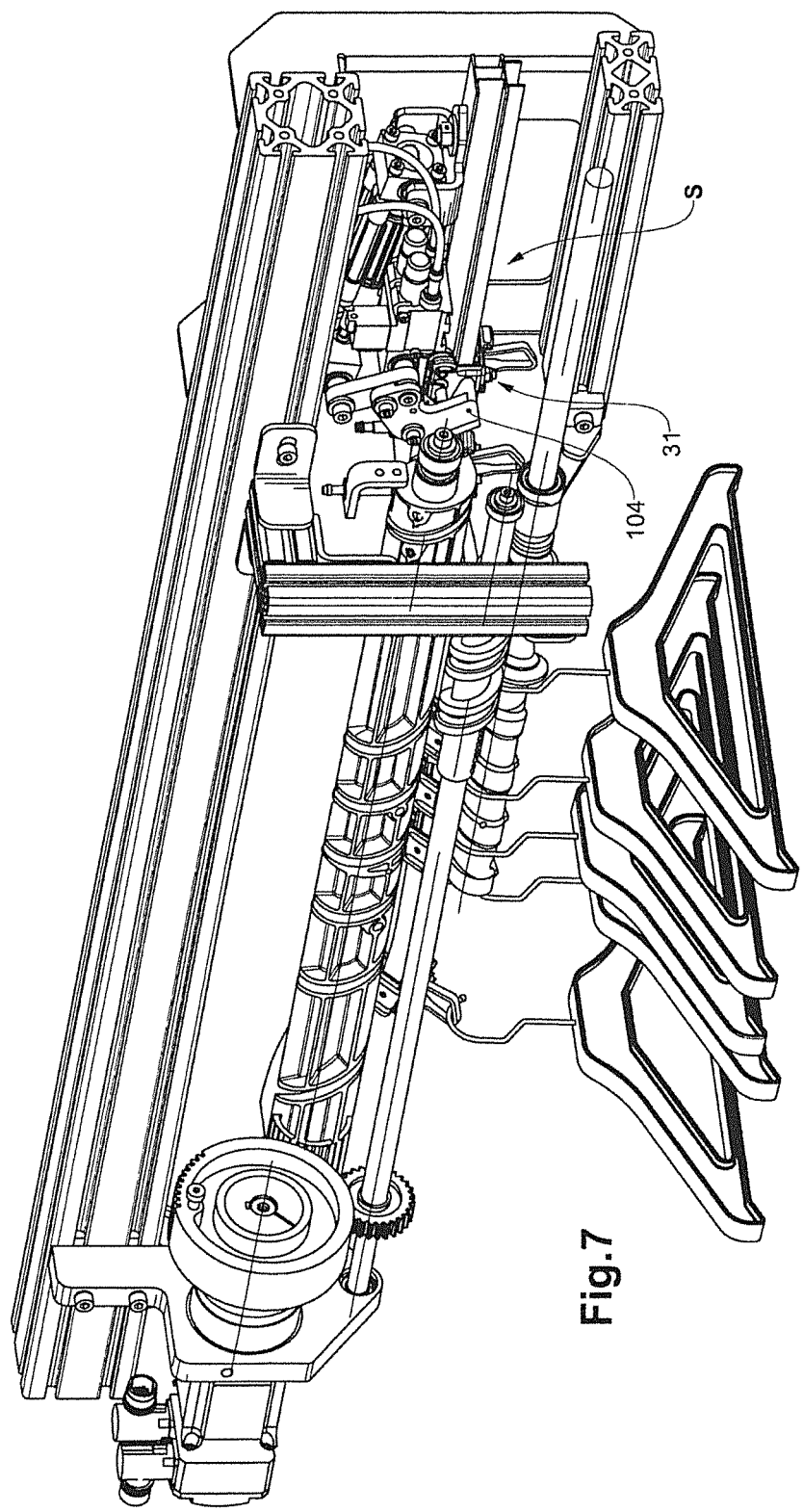

TRANSFER DEVICE FOR PRODUCT CARRIERS WITH HOLDING MEANS

CROSS-REFERENCE TO RELATED APPLICATIONS

Swiss Patent Applications 01458/16, filed 1 Nov. 2016 and 00413/17, filed 28 Mar. 2017, the priority documents corresponding to this invention, to which a foreign priority benefit is claimed under Title 35, United States Code, Section 119, and their entire teachings are incorporated, by reference, into this specification.

BACKGROUND OF THE INVENTION

Field of the Invention

The present invention relates to a transfer device for the separated transfer of product carriers with holders to an overhead conveyor, a conveyor system for conveying product carriers with holders, with a transfer device and an overhead conveyor, and a method for operating the conveyor system.

Discussion of Related Art

In the area of conveyor technology, the selection and the design of the conveyor systems and the conveying devices depend primarily on the nature of the products to be conveyed. The products to be conveyed, depending on their nature, can for example be conveyed directly in suitable transport units of the conveying devices or can be accommodated and conveyed in the transport units by means of suitable product carriers. For certain requirements, on the other hand, separate transport units are not required and the products or the product carriers can be conveyed directly in the conveying device. Depending on the requirements, conveying devices and/or conveyor systems often comprise, in segments or in zones, different conveying sections with or without product carriers, transport units etc., between which transfer and/or feeding procedures take place.

When use is made of product carriers, particular questions may arise concerning the conveying, transfer, separation into single units etc., depending on the nature of the coupling of the product carriers, e.g. via suitable holders, to the conveying device or to the transport units of the conveying device. Such questions are highly relevant in the clothing industry, such as for example in collection warehouses, dispatch warehouses or chemical cleaning, where the items of clothing are conveyed by means of clothes hangers of the most varied kind. The clothes hangers usually comprise hooks, which engage in the conveying devices or transport units and thus provide the coupling between the product carrier and the conveying device or transport unit.

EP 0802133 B1 describes a device for separating conveyor carriers with a rotatably driven threaded spindle, the thread pitch whereof increases in the conveying direction, wherein the spindle is split up into a plurality of regions having a different pitch. In each region, at least two different thread pitches are provided, wherein, related to the conveying direction, the first thread pitch in each region is smaller than the last one in the preceding region, and the thread groove width of the threaded spindle increases in the conveying direction. An input device is also described, which comprises a device for separating into single units and a transfer conveyor located downstream of the latter, wherein the conveyor carriers are transferred from the separating device via an incline onto the transfer conveyor. The conveyor carriers are conveyed by the transfer conveyor to a transfer point, where they slide over an incline into a conveyor pocket of an overhead conveyor system.

EP 1914182 B1 describes a supply-transport system for hangers with articles suspended thereon, in particular items of clothing, with a transport rail for receiving and guiding hooks of the hangers, with a transfer station arranged at one end of the transport rail for transferring one hanger at a time onto individually transportable holding elements, which each comprise in their lower region a receiving opening for a hook of a hanger, and with a transfer wheel assigned to the transfer station. The transfer wheel takes up one holding element at a time in a position in which it projects, with respect to the vertical, obliquely out of the transfer wheel, so that the receiving opening in a projection onto the horizontal is upwardly open. A hanger falls cyclically downwards each time through a transfer gap, said hanger being caught by the receiving opening, since the free end of the hook is located above the receiving opening. The hook thus falls into the receiving opening and is thus caught by the holding element.

DE 4326095 C1 describes delivery devices to overhead conveyors for conveyed goods suspended on clothes hanger hooks, comprising conveying hooks with a holding finger which run on a support profile and are drawn by a traction mechanism, a step-mode conveying device for conveyed goods suspended on clothes hanger hooks, e.g. items of clothing, a short transfer path in the extension of the step-mode conveying device with a U-shaped cross-section and a stop nose at the free end. The transfer path and the running path of the conveyor hooks are at an acute angle to one another and the holding finger dips into the channel between the U-legs, so that the holding finger can run beneath a clothes hanger hook waiting at the stop nose and can lift the latter over the stop nose. Endlessly circulating, parallel conveyor belts, on the upper run whereof the clothes hanger hooks sit, are integrated into the U-legs of the transfer path.

SUMMARY OF THE INVENTION

In the conveying of products by means of product carriers with holders, the reliable engagement of the holders in the conveying devices or transport units of the conveying devices is of great importance for minimizing errors in the conveying of products. In order to ensure a high conveying capacity and conveying speed, reliable transfer procedures and/or feeding procedures of the products or product carriers between different sections or regions of a conveyor system play an important part. In the case of certain holders, such as hooks for example, there are additional demands in connection with the separating of the products or product carriers into single units, in particular when the holders have a tendency to impair the conveying capacity due to mutual interaction.

It is a problem of the invention, therefore, to improve the prior art of conveying product carriers with holders, in particular the separated transfer.

The problem is solved by the features of the independent claims. Advantageous embodiments of the invention are given in the dependent claims and in the present description and the figures.

The invention relates to a transfer device for the separated transfer of product carriers with holders to an overhead conveyor, comprising a helical conveyor, which defines a conveying section for the holders with a conveying portion and a transfer portion, wherein the conveying section in the conveying portion describes a linear path and in the transfer portion describes a transversely curved path superimposed on the linear path.

The helical conveyor offers the advantage that controlled conveying of the product carriers is enabled, in particular for product carriers with holders, which have a tendency to execute uncontrolled movements, such as swinging movements or suchlike. In connection with this invention, controlled conveying is understood to mean conveying of product carriers wherein the product carriers describe a guided path, for example via a defined support point on the helical conveyor, and that for example drop heights during transfers can be minimized or avoided. During controlled conveying, the holders or the product carriers usually remain standing essentially in the given current position when the helical conveyor stops and can be conveyed onward from this position when the rotation of the helical conveyor is resumed. In embodiments with hooks, which each sit on the helical conveyor over a support point, the support point usually remains at the given position each time when the helical conveyor stops, and the hooks can be conveyed onward from there when the rotation of the helical conveyor is resumed.

The conveying section is usually defined by the formation of the helical conveyor. The controlled conveying of product carriers can be improved by a conveying section thus defined. The conveying portion can advantageously serve to bring the product carriers onto the linear path of the conveying section along the longitudinal axis of the helical conveyor, on which the product carriers can be conveyed in a controlled manner. This can be advantageous especially if the product carriers arrive at the transfer device from another conveying section, on which the conveying of the product carriers is controlled to a lesser extent, e.g. by a rail on which the product carriers are conveyed running freely.

As a result of the transversely curved path of the conveying section in the transfer portion, the product carriers can, in addition to the linear movement along the longitudinal axis of the helical conveyor, be moved normal to the longitudinal axis of the helical conveyor, which enables a controlled transfer of the product carriers to the overhead conveyor, which is arranged for example beside the helical conveyor, parallel to the helical conveyor or forming an angle with the helical conveyor. In this connection, a transverse path is understood to mean a path which lies in a plane perpendicular to the longitudinal axis of the helical conveyor.

The transversely curved path can be described by a superimposition of a horizontal and a vertical component in this plane, so that the transversely curved path has in particular a horizontal component, and a controlled transfer to an overhead conveyor arranged beside the transfer device can thus be enabled.

In the transfer portion, the transversely curved path is advantageously superimposed on the linear path from the conveying portion, in such a way that the conveying section defined by the helical conveyor runs continuously essentially along its entire extent and abrupt or unsteady movements of the product carriers can be minimized or avoided.

A particularly advantageous application of the invention is found in the clothing industry, where the product carriers are constituted as clothes hangers and the holders as clothes hooks. The product carriers can however also be pockets or containers, which comprise holders such as hooks for example. The product carriers are often delivered from a storage facility, such as a store room for example, or from another conveying device to the transfer device.

In an embodiment, the product carriers, in particular clothes hangers, are transferred via rails onto the helical conveyor. The product carriers can arrive from the rails at irregular intervals, which is usually the case with rails on which the product carriers are driven by means of gravitation. The product carriers transferred to the transfer device are preferably conveyed by the helical conveyor in a separated and controlled manner, in such a way that the product carriers are conveyed on the helical conveyor at a defined distance from one another.

The conveying section in the transfer portion preferably lies, for the majority or all of the helical conveyor positions, i.e. angles of rotation of the helical conveyor, in each case in a local minimum of the surface, preferably with respect to the longitudinal axis of the helical conveyor, in which local minimum the holders of the product carriers are conveyed.

In an embodiment, the helical conveyor comprises helical threads, in which the holders of the product carriers can be conveyed. The helical threads offer the advantage that defined application or engagement points for the holders of the product carriers are provided, such that a conveying section can be defined. A helical thread usually comprises a helix floor and helix flanks adjoining the helix floor. Holders constituted as hooks can for example be supported in the helix floors, so that a support point of a hook is conveyed along the defined conveying section. The hooks can lie laterally adjacent to the helix flanks, wherein the hooks, during rotation of the helical conveyor, can be pushed and conveyed by the helix flanks along the conveying section.

As a result of the rotation of the helical conveyor, therefore, linear conveying of the product carriers can be achieved along the longitudinal axis of the helical conveyor in the conveying portion of the conveying section.

In the transfer portion, the rotation of the helical conveyor in combination with a specific formation of the helical conveyor in the transfer portion, as will be explained below in the present description, can bring about the additional transversely curved path of the conveying section.

The helical conveyor is usually driven by suitable drive means, preferably electric motors.

A defined number of hooks or product carriers are preferably conveyed per helical thread. In an advantageous embodiment, an individual hook or product carrier is conveyed in each case per helical thread. In a further embodiment, two hooks or product carriers are conveyed per helical thread. Optionally, the defined number of hooks or product carriers per helical thread can differ between the helical threads. For example, the helical threads can alternately convey one or two hooks or product carriers in each case. The helical threads thus offer the advantage that the product carriers can be conveyed at a defined distance from one another, without the latter having a marked mutual influence, e.g. by striking against one another, which enables efficient separating of the product carriers into single units.

In an embodiment, the helical conveyor comprises at least one separating helical thread for separating hooks lying next to one another, said separating helical thread having a pitch different from the remaining helical threads. The separating helical thread preferably has at least in part in a zero pitch. The separating helical thread preferably arises from a step in a helix flank of a helical thread, by means of which step the two hooks lying next to one another can be spatially separated. The front hook in respect of the conveying direction can be conveyed onward through the helical thread in the conveying direction, while the rear hook enters into the separating helical thread.

As a result of the different pitch of the separating helical thread, the rear hook can be separated spatially farther from the front hook. Following one rotation, the rear hook separated spatially from the front hook can leave the separating helical thread and be conveyed onward in the conveying direction.

In an embodiment, the helical threads have a trapezoidal profile in an axial cross-section. In this embodiment, the bottoms of the helical threads assume the shorter base side and the helix flanks the legs of the trapezium. In a variant, the helical conveyor also has a trapezoidal profile between two adjacent helix flanks of two adjacent helical threads in an axial cross-section, wherein the outer face of the helical conveyor projected onto the axial cross-section assumes the shorter base side of the trapezium.

The helix flanks are optionally rounded. The helix flanks are preferably rounded in a concave manner. This improves the secure positioning of the holders in the helical threads and therefore the controlled conveying of the product carriers.

In a further embodiment, the helical threads have a pointed profile in an axial cross-section.

The helical threads can have alternating pointed or trapezoidal profiles segment by segment.

In an embodiment, the helical conveyor ends in the transfer portion in an eccentrically arranged guide tongue, which has a tapering cross-section as compared to the cross-section of the helical conveyor in the conveying portion.

The guide tongue offers the advantage that a holder can be conveyed in a guided or controlled manner up to the transfer to the overhead conveyor. As a result of the eccentric arrangement, it is possible for a holder conveyed by the guide tongue to be deflected from the linear path of the conveying section and to describe a transversely curved path superimposed with respect to the linear path.

The tapering cross-section offers the advantage that a portion of the holders can project in a transverse plane beyond the cross-section of the helical conveyor, said portion being able to be used for example for engagement with an engagement means during the transfer to the overhead conveyor.

In an embodiment, the helical conveyor comprises in the transfer portion a helical transfer thread with a quasi-anticlastic surface, wherein the conveying section in the transfer portion lies in the quasi-anticlastic surface, such that the holders describes a transversely curved path superimposed on the linear path.

A quasi-anticlastic surface is understood to mean a surface which, at a given point of the surface, has curvatures differing in sign in two different directions, i.e. is curved concave in a first direction and convex in a second direction. The two directions do not need to be orientated perpendicular to one another. When the helical conveyor is rotated, the conveying section advantageously comes to lie in the quasi-anticlastic surface, in such a way that the holders conveyed in the helical transfer thread during the transfer describes a transversely curved path in addition to the linear path.

The helical transfer thread preferably emerges into the eccentrically arranged guide tongue, from which the holders or the product carrier can be transferred to the overhead conveyor.

The surface of the helical transfer thread preferably has a saddle surface with a helical main direction.

The helical main direction of the saddle surface offers the advantage that the holders can be conveyed in a saddle point during the rotation of the helical conveyor, which enables an improved controlled conveying.

Along the helical main direction, the curvatures can vary along the direction normal to the main direction.

In a variant, the radius of curvature at the start of the helical transfer thread corresponds to the radius of the cross-section of the helical conveyor in the conveying portion and diminishes towards the end of the helical conveyor. The helical transfer thread can emerge into an eccentrically arranged guide tongue with a cross-section in the shape of a segment of a circle and a radius of curvature of the circle segment which is smaller than the radius of the cross-section of the helical conveyor in the conveying portion.

The embodiment of the helical conveyor with the helical transfer thread with a saddle surface thus offers the advantage that the holders can be conveyed in a controlled manner, wherein the conveying section in the transfer portion can describe a transversely curved path due to the shape of the surface of the helical transfer thread and the rotation of the helical conveyor. As a result of the controlled conveying, the transfer capacity, in particular the conveying speed, can be increased considerably.

In an embodiment, the helical transfer thread has a helix depth which is greater than half the core diameter of the helical conveyor in the conveying portion.

In an embodiment, the helical conveyor changes over continuously from the conveying portion into the helical transfer thread in the transfer portion.

The continuous change-over of the helical conveyor from the conveying portion into the helical transfer thread in the transfer portion offers the advantage that the conveying section can also run continuously and that abrupt conveying movements of the holders or the product carriers can be minimized or avoided.

The invention further relates to a conveyor system for conveying product carriers with holders, comprising a transfer device according to the present description, an overhead conveyor with a plurality of transport units for the product carriers, wherein the transport units comprise engagement means for the holders of the product carriers, and the conveyor system comprises a transfer region, in which the product carriers are transferred from the transfer device to the overhead conveyor.

As a rule, the overhead conveyor is arranged by the side of the transfer device, wherein the helical conveyor can form an angle with a conveying section of the overhead conveyor in the transfer region or can be arranged parallel thereto.

The transfer region is preferably formed by the transfer portion of the helical conveyor and the conveying section of the overhead conveyor, which is arranged next to the transfer portion of the helical conveyor. A product carrier is usually transferred from the transfer device to the overhead conveyor in such a way that the holders of the product carrier engages in the engaging means of a transport unit standing ready in the transfer region and the product carrier can be conveyed onward by the transport unit in the overhead conveyor.

In an embodiment, the engagement means of the transport units are eyelets, into which the holders, preferably hooks, of the product carriers can engage.

In an embodiment, the transport units are arranged inclined in the transfer region, in such a way that the openings of the eyelets are arranged normal to the transfer direction of the holders.

In an embodiment, the overhead conveyor comprises in the transfer region a conveying section which is arranged parallel to the helical conveyor.

A parallel arrangement of the conveying section of the overhead conveyor in the transfer region and the helical conveyor offers the advantage that the transfer region can be increased in size compared to arrangements in which the transfer device runs towards the overhead conveyor at a greater angle. An enlargement of the transfer region along the conveying section offers the advantage that the time window for a possible transfer of the product carriers to the overhead conveyor can be increased, so that the transfer of the product carriers can be better matched to the overhead conveyor, in particular by adaptation of the conveying speeds of the product carriers and the transport units.

In an embodiment, the overhead conveyor comprises a running rail, wherein the transport units are carriages which can be conveyed at a variable distance from one another on the running rail.

In an embodiment, the conveyor system comprises a control, which controls the transfer of the product carriers from the transfer device to the overhead conveyor.

The control can control, amongst other things, the conveying speeds of the transport units and/or of the product carriers, the availability of the transport units and/or of the product carriers etc.

The control preferably controls the overhead conveyor and/or the transfer device in such a way that, during the transfer of a product carrier, a transport unit is made available each time in the transfer region.

In an embodiment, the conveyor system comprises a first drive unit for driving the helical conveyor and a second drive unit for driving the transport units in the transfer region, wherein the first and the second drive unit are controlled by the control in such a way that a transport unit is made available in the transfer region each time during the transfer of a holder from the transfer device to the overhead conveyor.

In an embodiment, the first drive unit comprises a first helical drive, which is operatively connected to the helical conveyor. In a variant, the first helical drive engages in elevations between the helical threads of the helical conveyor and can thus drive the helical conveyor.

In an embodiment, the second drive unit comprises a second helical drive, which can be operatively connected to the transport units of the overhead conveyor. In a variant, the second helical drive comprises helical threads, into which driver elements of the transport units can engage, so that the transport units can be conveyed along the conveying section of the overhead conveyor during the rotation of the second helical drive.

The control offers the advantage that, during the transfer of a holder, a transport unit is made available each time and therefore a reliable transfer of the product carriers from the transfer device to the overhead conveyor is enabled.

In an embodiment, the control synchronizes the conveying speed of the transport units with the conveying speed of the product carriers during the transfer.

In embodiments with the first drive unit comprising a first helical drive and the second drive unit comprising a second helical drive, the first helical drive and the second helical drive can optionally be operatively connected, e.g. by means of a belt, so that the rotations of the first and the second helical drive are coupled.

In an embodiment, the control is constituted to control the number of product carriers transferred per transport unit in the transfer region.

This offers the advantage that, depending on the requirements, single or a plurality of product carriers can be conveyed per transport unit. For example, it may be advantageous to convey a clothing upper part and a pair of trousers in a set per transport unit. In a variant, the control controls the number of product carriers transferred per transport unit, in that the control allows a transport unit to wait in the transfer region until such time as the desired number of product carriers are transferred from the transfer device to this transport unit.

In an embodiment, a first sensor connected to the control is arranged on the helical conveyor, which sensor can detect holders of the product carriers on the helical conveyor.

This offers the advantage that the control is able to detect whether a holder is being conveyed to the transfer portion and therefore a transport unit is required. If need be, the control can then make a transport unit available in the transfer region. The first sensor can be an optical sensor, e.g. a camera or a light barrier, or an inductive sensor.

In an embodiment, a barrier element is arranged between an accumulating section of the overhead conveyor and the transfer region, which barrier element is connected to the control for the release of one transport unit each time when a holder is detected on the helical conveyor by the first sensor.

The accumulating section is preferably arranged upstream of the transfer region. The barrier element is constituted optionally to block or release the transport units. With the accumulating section, the transport units can advantageously be accumulated before the transfer region, in such a way that a controlled delivery of the transport units into the transfer region is enabled when a transport unit is required for a holder or a product carrier.

In an embodiment, the first sensor is constituted to detect undesired holders of product carriers on the helical conveyor, wherein the control is constituted to activate the barrier element when undesired holders are detected, in such a way that the transport units are accumulated in the accumulating section. As a result of the accumulating of transport units in the accumulating section when undesired holders are detected on the helical conveyor, the product carriers with the undesired holders can be removed instead of being transferred to the transport units.

Furthermore, the control is advantageously constituted to deactivate the barrier element in such a way that the accumulating transport units can be timely released again from the accumulating section and made available in the transfer region to take over following product carriers with desired holders.

The conveyor system preferably comprises a catch rail for removing product carriers with undesired holders, wherein the catch rail is arranged in the transfer region in such a way that product carriers are transferred from the transfer device to the catch rail if no transport unit is made available in the transfer region. As a result of the accumulating of the transport units in the accumulating section when undesired holders are detected on the helical conveyor, the product carriers with the undesired holders can be removed by transfer to the catch rail.

Undesired holders, i.e. those which are not to be conveyed onward by means of transport units on the overhead conveyor, may for example be hooks lying next to one another or crossed over one another, or those with empty product carriers, e.g. clothes hangers without items of clothing.

The catch rail is preferably constituted in such a way that the holders of the product carriers can engage in the catch rail. The catch rail is preferably arranged inclined, so that the product carriers transferred to the catch rail can be conveyed onward driven by the force of gravity.

In an embodiment without a catch rail, the undesired holders with the corresponding product carriers can be allowed to drop from the helical conveyor into space or into a collecting arrangement, e.g. a case.

In embodiments with a separating helical thread, an additional sensor can optionally be arranged upstream of the separating helical thread, which sensor can detect undesired holders at this point, in particular hooks lying next to one another, on the helical conveyor, wherein the first sensor is arranged downstream of the separating helical thread. Such an arrangement has the advantage that it can be detected by the first sensor whether the hooks lying next to one another detected by the additional sensor were able to be successfully separated by the separating helical thread. If hooks lying next to one another were not able to be separated, this can be detected by the first sensor, so that these hooks, or product carriers, can be removed.

In an embodiment, a second sensor is arranged downstream of the transfer region, said second sensor being constituted to determine the number of holders in each case in an engagement means of the transport unit.

The second sensor can be an optical sensor, for example a camera or a light barrier, or an inductive sensor. With a controlled transfer of a specific number of product carriers to a transport unit, it is possible to check by means of the second sensor whether the desired number of product carriers have actually been transferred to the transport unit.

In an embodiment, the conveyor system comprises further sensors, which are constituted to detect holders and/or transport units in different regions of the conveyor system.

In particular, a third sensor can be arranged at the accumulating section, said third sensor being constituted to detect transport units in the accumulating sector. The third sensor is preferably connected to the control. The third sensor offers the advantage that it can be ascertained whether transport units are available in the accumulating section which if need be can be delivered into the transfer region.

The invention also relates to a method for operating a conveyor system according to the present description, comprising the steps: i) conveying of the holders of the product carriers on the helical conveyor of the transfer device; ii) transferring the product carriers from the transfer device to the overhead conveyor in the transfer region, wherein the holders can be conveyed in a controlled manner during the transfer into the engagement means of a transport unit.

The controlled conveying offers the advantage that, during the transfer, conveying procedures in which uncontrolled movements are promoted, such as dropping procedures for example, can be minimized or avoided.

In an embodiment of the method, the holders lie in the transfer portion of the helical conveyor on a support point on the helical conveyor, which diverges from the vertical plane defined by the longitudinal axis of the helical conveyor, such that a portion of the holders, preferably a hook, projects in a transverse direction, preferably orientated towards the overhead conveyor, beyond the cross-sectional area of the helical conveyor.

The portion of the holders projecting beyond the cross-sectional area of the helical conveyor can advantageously be used to introduce this portion into an engagement means of a transport unit made available in the transfer region before the holders engages in the engagement means and the product carrier is transferred to the transport unit. In this way, the controlled transfer can be improved. In particular, the drop height of the holders into the engagement means during the transfer can be minimized and a disruption can thus be minimized or avoided.

The holders are preferably conveyed in a controlled manner during the transfer in such a way that a portion of the holders, preferably a hook, projects each time into the engagement means, preferably an eyelet, of a transport unit, before the holders leaves the transfer device and is transferred to the overhead conveyor.

In an embodiment of the method, the first sensor detects undesired holders of product carriers on the helical conveyor and activates the barrier element when undesired holders are detected, in such a way that the transport units are accumulated in the accumulating section.

As a result of the accumulating of the transport units in the accumulating section when undesired holders are detected on the helical conveyor, the product carriers with the undesired holders can be removed instead of being transferred to transport units, e.g. in that the product carriers with the undesired holders are transferred, in the case of embodiments of the conveyor system with a catch rail, to said catch rail.

Furthermore, the control can deactivate the barrier element in such a way that the accumulated transport units can be timely released again from the accumulating section and can be made available in the transfer region for the transfer of following product carriers with desired holders.

BRIEF DESCRIPTION OF SEVERAL VIEWS OF THE DRAWINGS

Embodiments of the invention are explained below with the aid of the following figures and the associated description. In the figures:

FIG. 5a shows a diagrammatic representation of the transfer portion in a front view of the helical conveyor in a first position;

FIG. 5b shows the diagrammatic representation of the transfer portion shown in FIG. 5a in a different position;

FIG. 5c shows the diagrammatic representation of the transfer portion shown in FIG. 5a in a different position;

FIG. 5d shows the diagrammatic representation of the transfer portion shown in FIG. 5a in a different position;

FIG. 5e shows the diagrammatic representation of the transfer portion shown in FIG. 5a in a different position;

FIG. 5f shows the diagrammatic representation of the transfer portion shown in FIG. 5a in a different position;

FIG. 5g shows the diagrammatic representation of the transfer portion shown in FIG. 5a in a different position;

FIG. 5h shows the diagrammatic representation of the transfer portion shown in FIG. 5a in a different position;

FIG. 6 shows a further perspective partial view of the conveyor system from FIG. 1;

FIG. 7 shows a rear perspective partial view of the conveyor system from FIG. 1;

DESCRIPTION OF PREFERRED EMBODIMENTS

In order to illustrate the invention, preferred embodiments are described in greater detail by reference to the figures.

Figure 1:
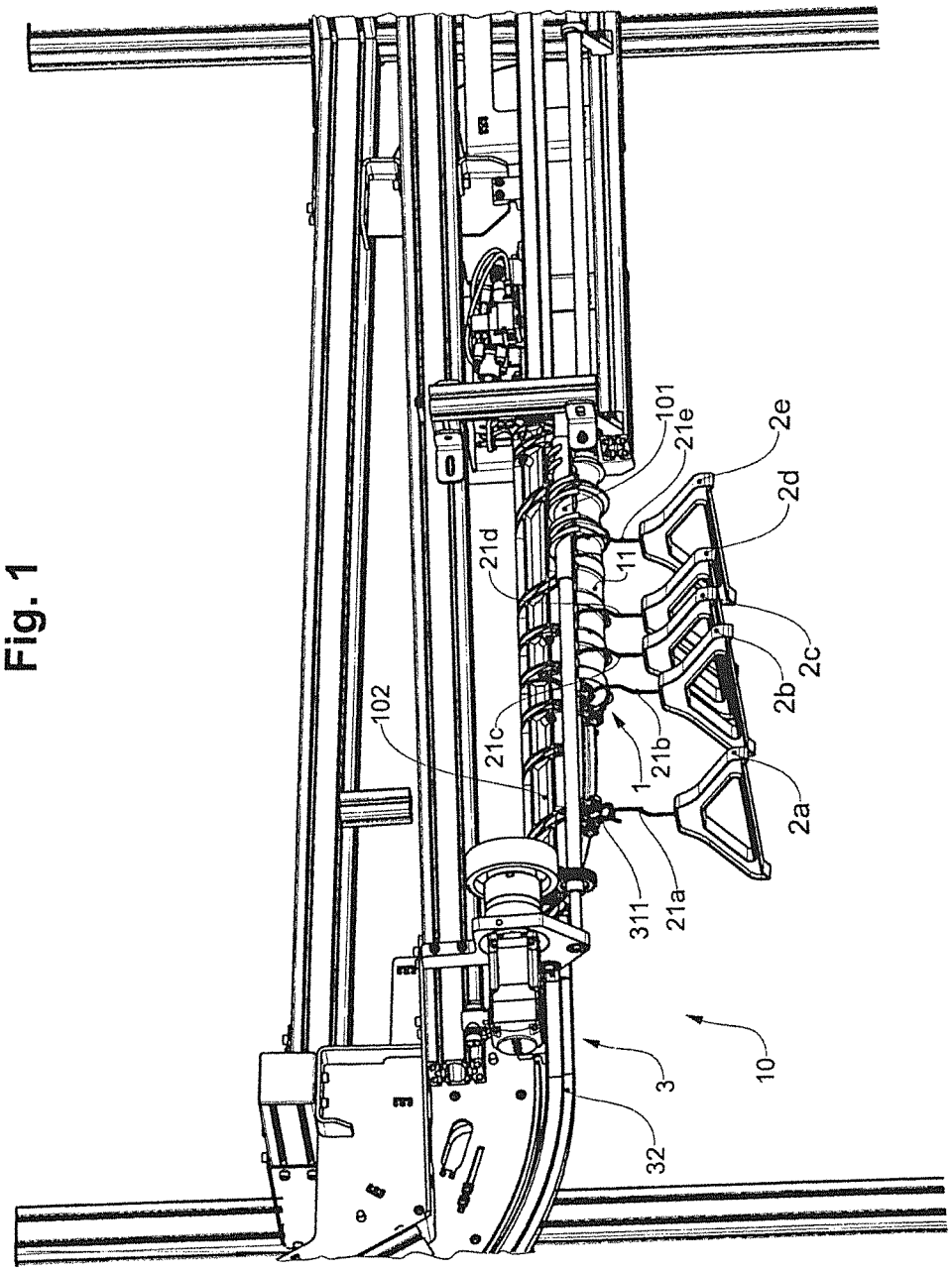
FIG. 1 shows a perspective partial view of an embodiment of a conveyor system.

FIG. 1 shows a perspective partial view of an embodiment of a conveyor system 10. Conveyor system 10 comprises a transfer device 1 and an overhead conveyor 3 with a running rail 32, on which transport units (concealed by transfer device 1 in the figure) are arranged. Transfer device 1 comprises a helical conveyor 11, on which hooks 21b-e are arranged and which thus conveys product carriers 2b-e. Product carrier 2a with hook 21a is already transferred to overhead conveyor 3 and is no longer located on helical conveyor 11. Hook 21a is thus engaged with an eyelet 311 of a transport unit. Helical conveyor 11 is driven by a first helical drive 101. A second helical drive 102, which drives the transport units of overhead conveyor 3, is also represented.

Figure 2:
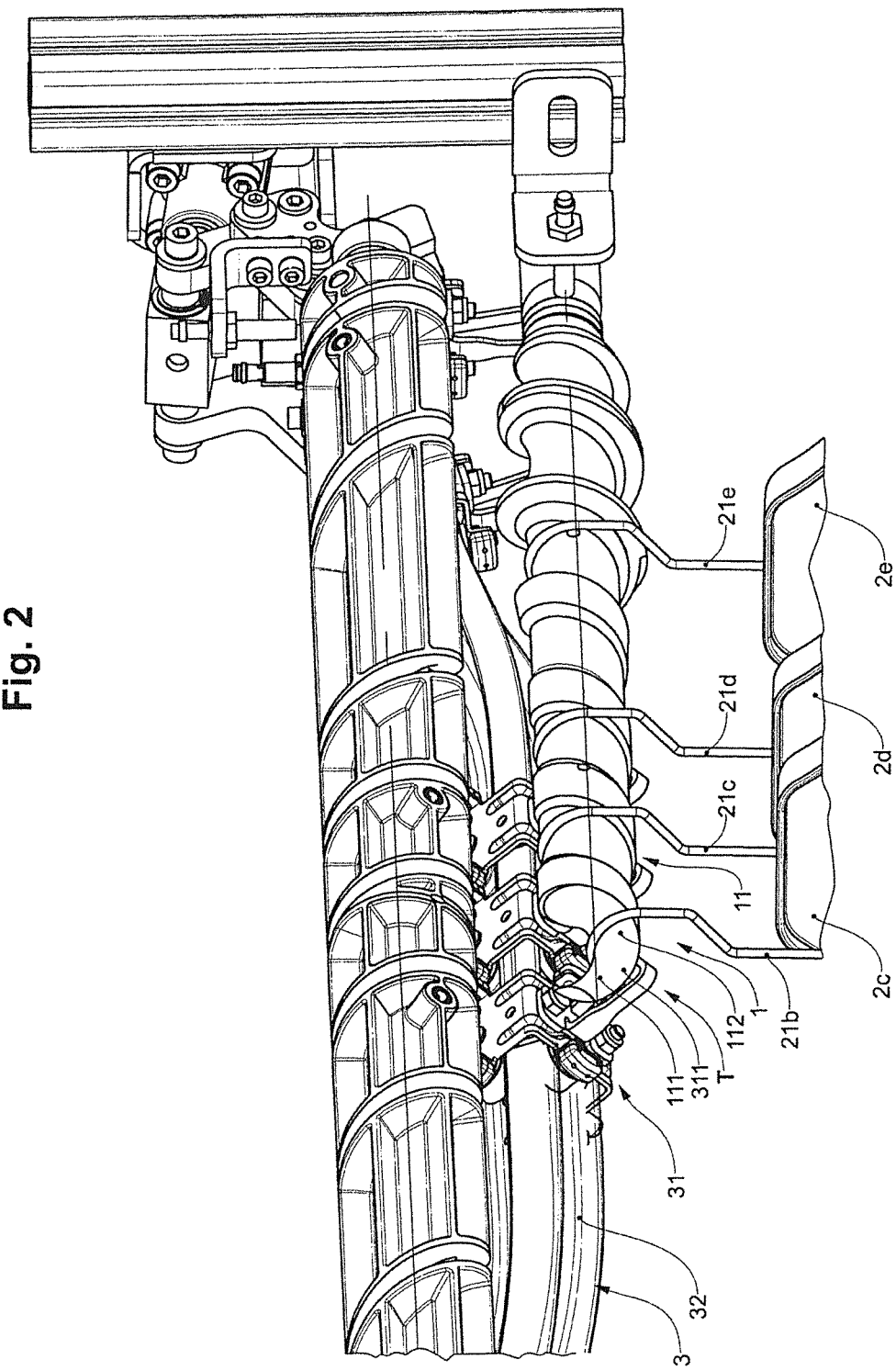
FIG. 2 shows a perspective view of the conveyor system from FIG. 1 around the transfer region.

FIG. 2 shows a perspective view of the conveyor system from FIG. 1 around transfer region T. Helical conveyor 11 of transfer device 1 comprises a first helical transfer thread 112, which ends in an eccentrically arranged guide tongue 111. Helical transfer thread 112 has a quasi-anticlastic surface in the form of a saddle surface with a helical main direction. Located in helical transfer thread 112 is hook 21b, which is supported in a saddle point of the saddle surface. The product carrier of hook 21b cannot be seen in the figure. By rotation of helical conveyor 11, hook 21b describes, in addition to a linear path along helical conveyor 11, a transversely curved path, by means of which hook 21b is conveyed in a controlled manner in the direction of overhead conveyor 3. The end of hook 21b projects into eyelet 311 of a transport unit 31 made available in transfer region T, which transport unit is a carriage movable on running rail 32 of overhead conveyor 3. Two further following carriages are shown in the figure, which are partially concealed by helical conveyor 11. Hooks 21c, 21d and 21e of product carriers 2c, 2d and 2e are arranged behind hook 21b on helical conveyor 11.

Figure 3:
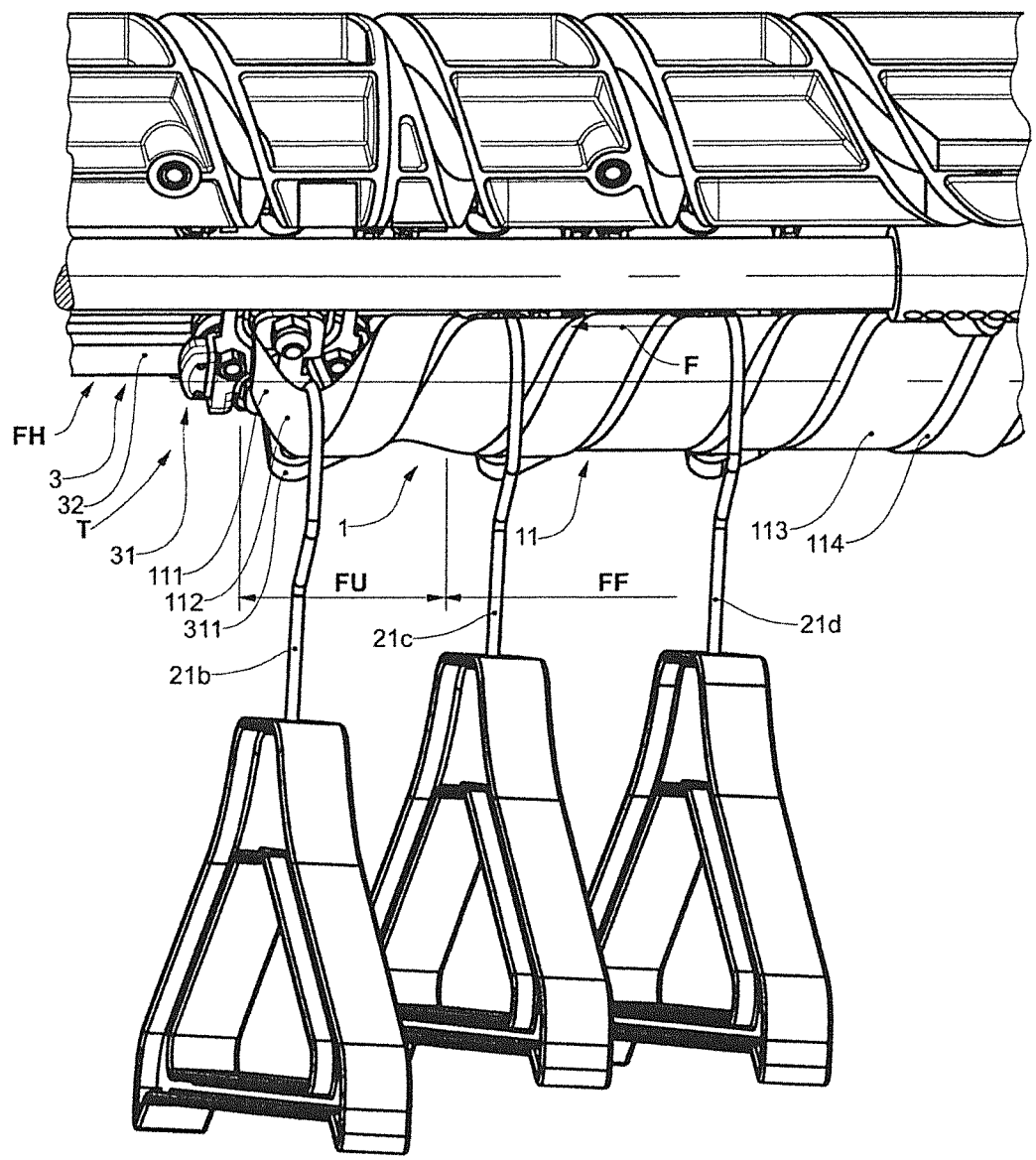
FIG. 3 shows a side view of the conveyor system from FIG. 1 around the transfer region.

FIG. 3 shows a side view of the conveyor system from FIG. 1 around transfer region T. Helical conveyor 11 of transfer device 1 comprises helical threads 113 with thread flanks 114. Helical conveyor 11 defines a conveying section for hooks 21b-d with a conveying portion FF and a transfer portion FU. Located in transfer portion FU is helical transfer thread 112, which leads into guide tongue 111. In conveying portion FF, hooks 21c and 21d are conveyed by rotation of helical conveyor 11 on a linear path along the longitudinal axis of helical conveyor 11. The linear path of the conveying section in conveying portion FF is illustrated diagrammatically by arrow F. In transfer portion FU, the rotation of helical conveyor 11 leads to a transversely curved path of hook 21b that is superimposed on the linear path along the longitudinal axis of helical conveyor 11. Hook 21b lies in a local minimum of the surface of helical transfer thread 112 relative to the longitudinal axis of helical conveyor 11. Transport units 31 are arranged on a conveying section FH of the overhead conveyor, said conveying section being arranged parallel to helical conveyor 11 in the transfer region. It can be seen in the figure how helical transfer thread 112 of transfer portion FU continuously changes over into a helical thread 113 of conveying portion FF.

Figure 4:
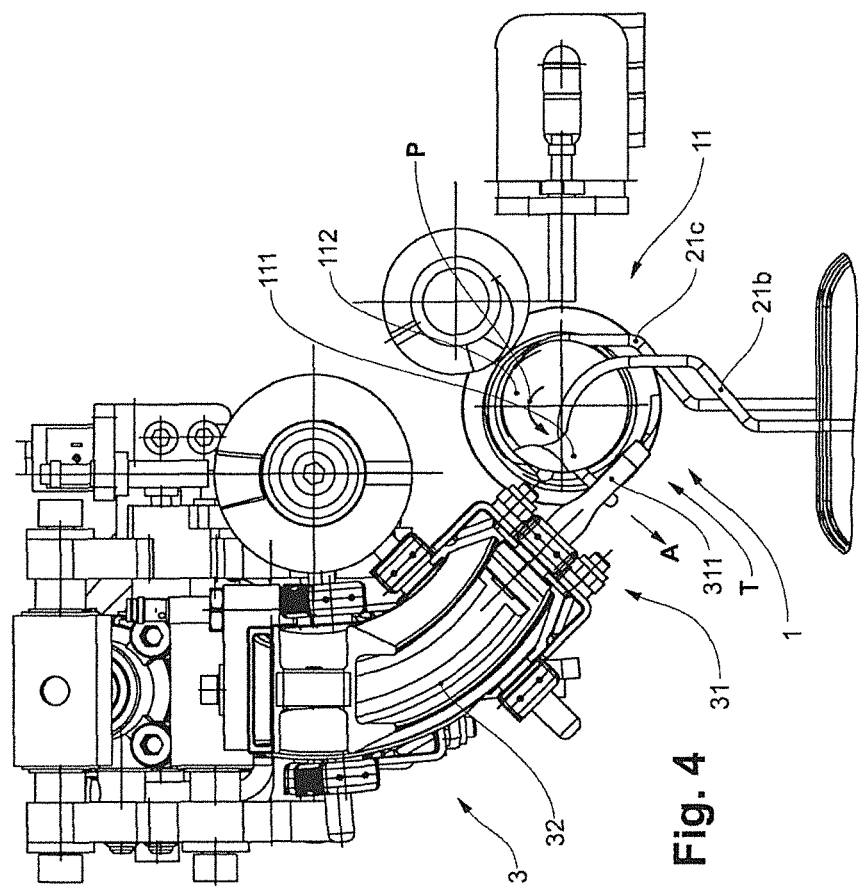
FIG. 4 shows a front view of the transfer region of the conveyor system from FIG. 1.

FIG. 4 shows a front view of transfer region T of the conveying system from FIG. 1. Eccentrically arranged guide tongue 111 with a circle segment-shaped cross-section can be seen. The radius of curvature of the circle segment-shaped cross-section of guide tongue 111 is smaller than the radius of the cross-sectional area of helical conveyor 11. It can also be seen how helical transfer thread 112 continuously changes over into guide tongue 11. Hook 21b, which is located in helical transfer thread 112, projects with one end into eyelet 311 of transport unit 31 of overhead conveyor 3, while hook 21b is supported on guide tongue 11. By rotation of helical conveyor 11 in the direction of arrow P, hook 21b is transferred from guide tongue 111 in direction A into eyelet 311. Running rail 32 is arranged in the transfer region in such a way that transport unit 31 is inclined and the opening of eyelet 311 thus stands essentially perpendicular to direction A, which facilitates the transfer of hook 21b.

FIGS. 5a-5h show a diagrammatic representation of the transfer portion in a front view of helical conveyor 11. The figures show helical conveyor 11 with helical transfer thread 112 and guide tongue 111 for different angular positions of helical conveyor 11, which rotates in direction P of the arrow, as shown in FIG. 5b. Helical transfer thread 112 has a saddle-shaped surface. In order to illustrate the transversely curved path of the conveying section superimposed on the linear path in the transfer portion of helical conveyor 11, support point AP of a hook 21 located in helical transfer thread 112 is shown for different angular positions of helical conveyor 11. The transversely curved conveying section is illustrated diagrammatically by curved arrow F. In FIG. 5a, the hook is located shortly before entry into the transfer portion of helical conveyor 11 and is supported by support point AP on helical thread 113, which adjoins helical transfer thread 112. After entry into the transfer portion, support point AP lies in each case on a saddle point of the surface of helical transfer thread 112. It can be seen that support point AP of hook 21 shortly before entry into helical transfer thread 112 lies, as shown in FIG. 5a, in the vertical plane defined by the longitudinal axis of helical conveyor 11. Shortly before the transfer to an overhead conveyor, as shown in FIG. 5h, support point AP diverges from the vertical plane in such a way that a portion 211 of hook 21 projects beyond the cross-sectional area of helical conveyor 11 in direction A of the transfer, so that portion 211 can engage in an eyelet of a transport unit standing ready in the transfer region, before guide tongue 111 releases hook 21 through further rotation of helical conveyor 11.

FIG. 6 shows a further perspective partial view of the conveyor system from FIG. 1. First helical drive 101 and second helical drive 102 can be seen. First helical drive 101 comprises helical threads 1011, which engage in elevations 115 of helical conveyor 11 and drive the latter by rotation of helical conveyor 11. Second helical drive 102 comprises helical threads 1021, which engage in driver elements of transport units 31 and can thus drive transport units 31 along the running rail (concealed in the figure).

A first sensor 103 can also be seen in the figure, which is arranged in a rear region of helical conveyor 11 and can detect hooks on helical conveyor 11.

FIG. 7 shows a rear perspective view of the conveyor system from FIG. 1. Transport unit 31 can be seen, which is located in an accumulating section S of the overhead conveyor. A barrier element 104 holds transport element 31 in accumulating section S. When the first sensor detects a hook on the helical conveyor, barrier element 104 releases transport unit 31 from accumulating section S, so that transport unit 31 can be conveyed into the transfer region.

Figure 8A:
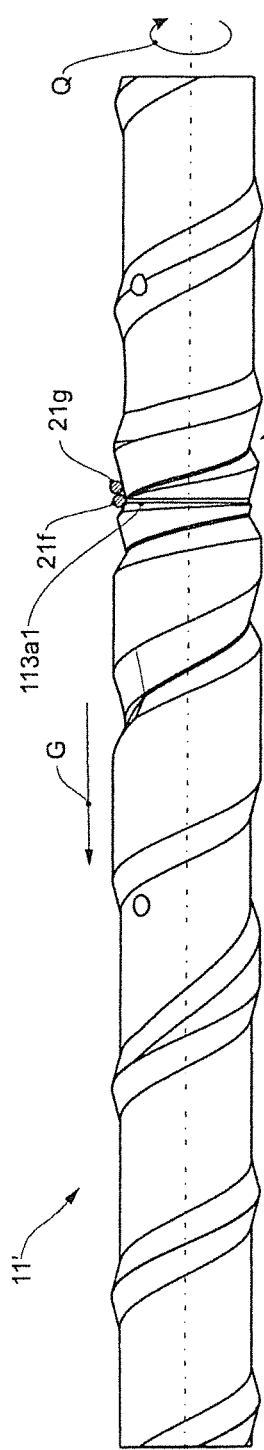
FIG. 8a shows a side view of an embodiment of a helical conveyor with a separating helical thread in a position of the helical conveyor.
Figure 8B:
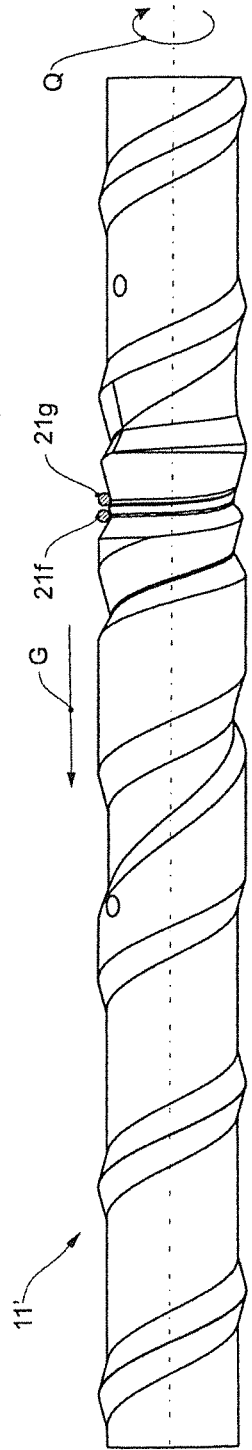
FIG. 8b shows a side view of the embodiment of FIG. 8a in a different position of the helical conveyor.
Figure 8C:
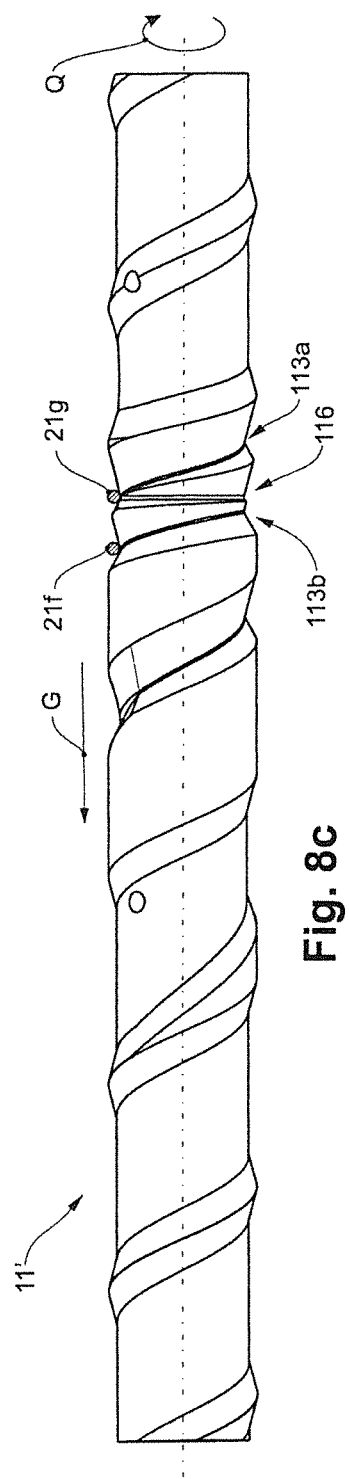
FIG. 8c shows a side view of the embodiment of FIG. 8a in a different position of the helical conveyor.

FIGS. 8a-c show side views of an embodiment of a helical conveyor 11' with a separating helical thread 116 for different positions of helical conveyor 11'. In the position of helical conveyor 11' shown in FIG. 8a, separating helical thread 116 lies between helical threads 113a and 113b and has a zero pitch in the portion shown. Helical conveyor 11' rotates in the direction of arrow Q. The conveying direction is indicated by arrow G. Hooks 21f and 21g are supported on helical conveyor 11' at a point in which separating helical thread 116 is formed by a step in thread flank 113a1. Hooks 21f and 21g are spatially separated by separating helical thread 116, which can be seen in FIG. 8b, which shows helical conveyor 11' after a half rotation relative to the position in FIG. 8a. As a result of the spatial separation, hook 21f can be conveyed onward in direction G. Hook 21g is located in separating helical thread 116 and describes an additional loop around helical conveyor 11'. In FIG. 8c, helical conveyor 11' is again shown in the position from FIG. 8a, wherein hook 21f is spatially separated from hook 21g in helical thread 113b and is conveyed in the direction of G. Hook 21g is in the point of helical conveyor in which separating helical thread 116 coincides with helical thread 113a. Since hook 21g is separated at this point, i.e. no hook is located in front of it (as is the case in FIG. 8a), hook 21g can be conveyed through helical thread 113a in the direction of G, without entering into separating helical thread 116.

Figure 9:
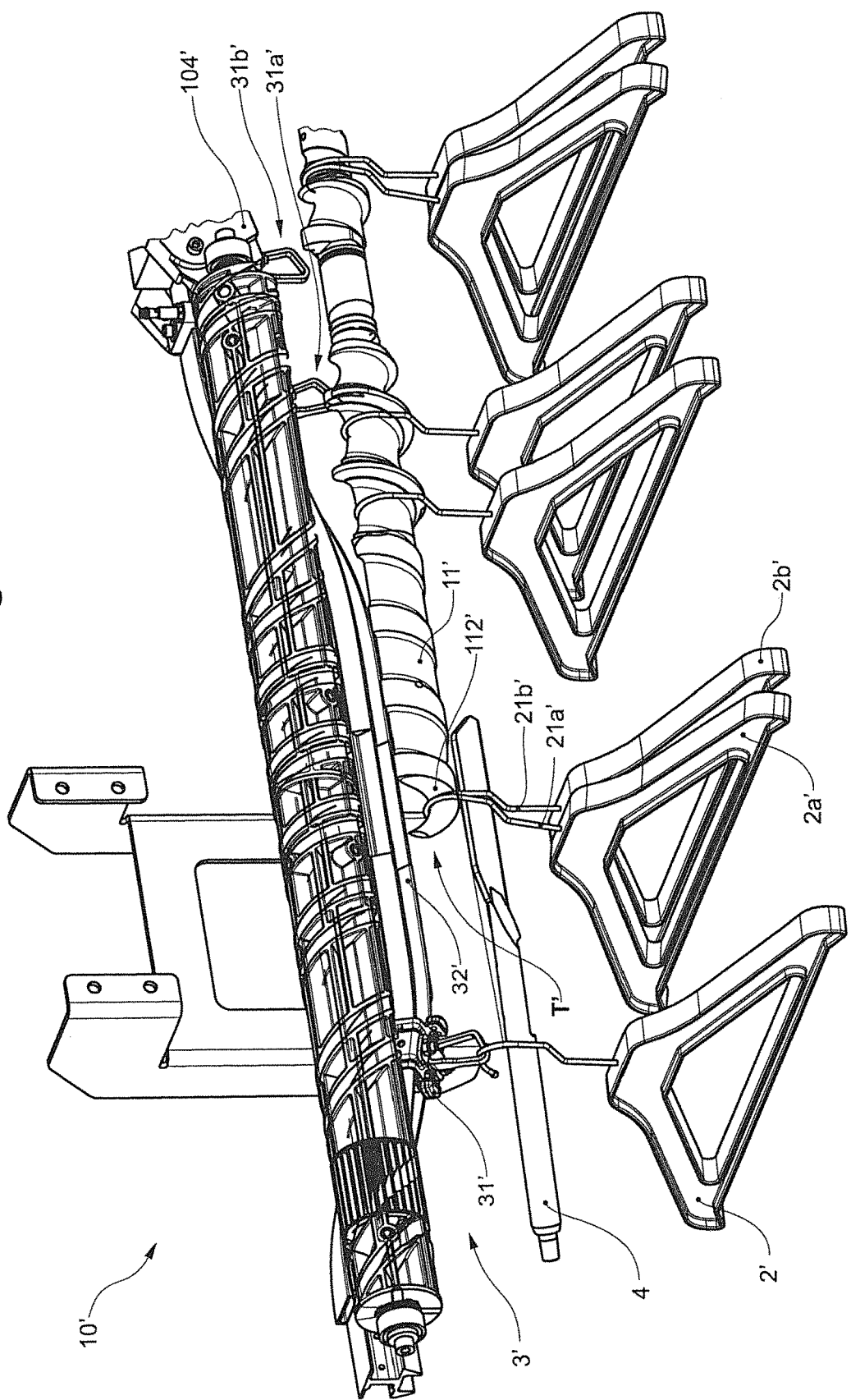
FIG. 9 shows a perspective partial view of a further embodiment of a conveyor system.
Figure 10:
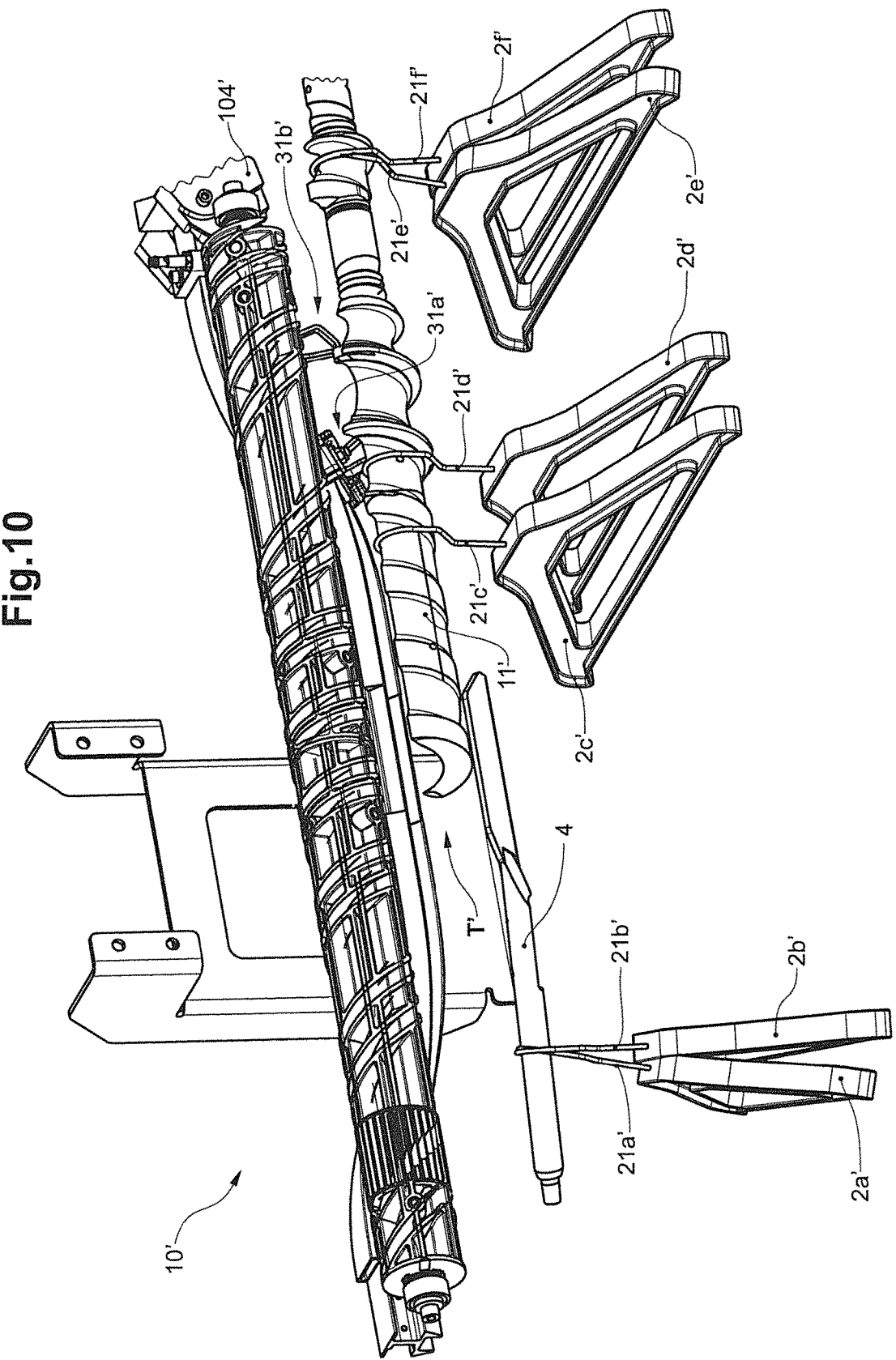
FIG. 10 shows a further perspective partial view of the conveyor system from FIG. 9.

FIG. 9 shows a perspective partial view of another embodiment of a conveyor system 10'. A catch rail 4 is arranged beneath running rail 32 of overhead conveyor 3' in transfer region T'. A product carrier 2' has already been transferred to a transport unit 31' of overhead conveyor 3'. Hooks 21a', 21b' of product carriers 2a', 2b' are located in helical transfer thread 112' of helical conveyor 11', wherein hooks 21a', 21b' are crossed over and therefore are undesired for further conveying by overhead conveyor 3'. A first sensor (not shown in FIG. 9) is arranged in helical conveyor 11' and constituted to detect undesired hooks, such as for example crossed-over hooks 21a', 21b'. The first sensor is connected to a control, which in turn is connected to a barrier element 104'. Barrier element 104' is constituted to hold back transport units in an accumulating section of the overhead conveyor if the first sensor detects undesired hooks on the helical conveyor. In FIG. 9, transport units 31a', 31b' have been held back by barrier element 104' on account of undesired hooks 21a', 21b', wherein in FIG. 9 transport elements 31a', 31b' are shown shortly after renewed release by barrier element 104'. Transport units 31a', 31b' are held back by barrier element 104' so long in the accumulating section that, at the time at which undesired hooks 21a', 21b' come into transfer region T', no transport units are present in transfer region T' and undesired hooks 21a', 21b' or product carriers 2a', 2b' can thus be removed, instead of being transferred into transport units. Retained transport units 31a', 31b' are then timely released again by barrier element 104' from the accumulating section, so that transport units 31a', 31b' can be made available for taking over following hooks on helical conveyor 11' in transfer region T'. FIG. 10 shows a further perspective partial view of conveyor system 10' from FIG. 9, wherein helical conveyor 11' has been rotated further with respect to the position in FIG. 9, such that product carriers 2a', 2b' with undesired hooks 21a', 21b' have been transferred to catch rail 4. Since no transport units were made available to take over product carriers 2a', 2b' in transfer region T', product carriers 2a', 2b' have been transferred to catch rail 4, by means of which product carriers 2a', 2b' with crossed-over hooks 21a', 21b' are removed. Transport units 31a', 31b' have been moved somewhat in the direction of transfer region T' compared to the position in FIG. 9, so that they can be made available in transfer region T' for next product carriers 2c', 2d' with hooks 21c', 21d'. For following product carriers 2e', 2f with crossed-over hooks 21e', 21f, the control can again activate barrier element 104' upon detection by the first sensor, in order that subsequent transport units are again held back and product carriers 2e', 2f can be transferred to catch rail 4.

I claim:

1. A transfer device (1) for the separated transfer of product carriers (2a-2e; 2c', 2d') with holders (21, 21a-21e; 21c', 21d') to an overhead conveyor, the transfer device (1) comprising:
 a helical conveyor (11, 11') forming a conveying section (F) for the holders (21, 21a-21e; 21a'-21f') with a conveying portion (FF) and a transfer portion (FU), wherein the conveying section (F) in the conveying portion (FF) following a linear path and in the transfer portion (FU) following a transversely curved path superimposed on the linear path, wherein the helical conveyor (11, 11') ends in the transfer portion (FU) in an eccentrically arranged guide tongue (111), which has a tapering cross-section as compared to the cross-section of the helical conveyor (11, 11') in the conveying portion.

2. The transfer device (1) according to claim 1, wherein the helical conveyor (11, 11') comprises in the transfer portion (FU) a helical transfer thread (112, 112') with a anticlastic surface, wherein the conveying section (F) in the transfer portion (FU) lies in the anticlastic, such that the holders (21, 21a-21e; 21a'-21f') follow a transversely curved path superimposed on a linear path.

3. The transfer device (1) according to claim 2, wherein the surface of the helical transfer thread (112, 112') comprises a saddle surface with a helical main direction.

4. The transfer device (1) according to claim 2, wherein the helical transfer thread (112, 112') has a helix depth (w) which is greater than half the core diameter (d) of the helical conveyor (11, 11') in the conveying portion (FF).

5. The transfer device (1) according to claim 2, wherein the helical conveyor (11, 11') changes over continuously from the conveying portion (FF) into the helical transfer thread (112, 112') in the transfer portion (FU).

6. A conveyor system (10, 10') for conveying product carriers (2a-2e; 2a'-2f') with holders (21, 21a-21e; 21a'-21f'), the conveyor system (10, 10') comprising:
 a transfer device (1) according to claim 1;
 an overhead conveyor (3, 3') with a plurality of transport units (31; 31', 31a', 31b') for the product carriers (2a-2e; 2a'-2f'), wherein the transport units (31; 31', 31a', 31b') comprise engagement means (311) for the holders (21, 21a-21e; 21a'-21f') of the product carriers (2a-2e; 2a'-2f'); and
 a transfer region (T, T'), in which the product carriers (2a-2e; 2a'-2f') are transferred from the transfer device (1) to the overhead conveyor (3, 3').

7. The conveyor system (10, 10') according to claim 6, wherein the overhead conveyor (3, 3') comprises in the transfer region (T, T') a conveying section (FH) which is arranged parallel to the helical conveyor (11, 11').

8. The conveyor system (10, 10') according to claim 6, wherein the overhead conveyor (3, 3') comprises a running rail (32, 32'), wherein the transport units (31; 31', 31a', 31b')

are carriages conveyed at a variable distance from one another on the running rail (32, 32').

9. The conveyor system (10, 10') according to claim 6, wherein the conveyor system (10, 10') comprises a control, which controls the transfer of the product carriers (2a-2e; 2a'-2f') from the transfer device (1) to the overhead conveyor (3, 3').

10. The conveyor system (10, 10') according to claim 9, wherein the conveyor system (10, 10') comprises a first drive unit (101) for driving the helical conveyor (11, 11') and a second drive unit (102) for driving the transport units (31; 31', 31a', 31b') in the transfer region (T, T'), wherein the first drive unit (101) and the second drive unit (102) are controlled by the control in such a way that a transport unit (31; 31', 31a', 31b') is made available in the transfer region (T, T') each time during transfer of a holder of the holders (21, 21a-21e; 21c', 21d') from the transfer device (1) to the overhead conveyor (3, 3').

11. The conveyor system (10, 10') according to claim 9, wherein the control synchronizes the conveying speed of the transport units (31; 31', 31a', 31b') with the conveying speed of the product carriers (2a-2e; 2c', 2d') during the transfer.

12. The conveyor system (10, 10') according to claim 9, wherein the control is configured to control the number of product carriers (2a-2e; 2c', 2d') transferred per transport unit (31; 31', 31a', 31b') in the transfer region (T, T').

13. The conveyor system (10, 10') according to claim 9, wherein a first sensor (103) connected to the control is arranged on the helical conveyor (11, 11'), which sensor can detect holders (21, 21a-21e) of the product carrier (2a-2e; 2a'-2f') on the helical conveyor (11, 11').

14. The conveyor system (10, 10') according to claim 13, wherein a barrier element (104, 104') is arranged between an accumulating section of the overhead conveyor (3, 3') and the transfer region (T, T'), which barrier element is connected to the control for the release of one transport unit (31; 31', 31a', 31b') each time when a holder of the holders (21, 21a-21e; 21a'-21f') is detected on the helical conveyor (11, 11') by the first sensor (103).

15. The conveyor system (10, 10') according to claim 14, wherein the first sensor is configured to detect undesired holders (21a', 21b', 21e', 21f') of product carriers (2a', 2b', 2c', 2f') on the helical conveyor (11, 11'), wherein the control is constituted to activate the barrier element (104') when undesired holders (21a', 21b', 21e', 21f') are detected, in such a way that the transport units (31', 31a', 31b') are accumulated in the accumulating section.

16. The conveyor system (10') according to claim 6, wherein the conveyor system (10') comprises a catch rail (4) for removing product carriers (2a', 2b', 2e', 2f') with undesired holders (21a', 21b', 21e', 21f'), wherein the catch rail (4) is arranged in the transfer region (T') in such a way that product carriers (2a', 2b', 2e', 2f') are transferred from the transfer device to the catch rail (4) if no transport unit is made available in the transfer region (T').

17. The conveyor system (10, 10') according to claim 6, wherein a second sensor is arranged downstream of the transfer region (T, T'), said second sensor being configured to determine the number of holders (21, 21a-21e; 21c', 21d') in a given engagement means (311) of the transport unit (31; 31', 31a', 31b').

18. A method for operating a conveyor system (10, 10'), comprising the steps of:
  i) providing a transfer device (1) for the separated transfer of product carriers (2a-2e; 2c', 2d') with holders (21, 21a-21e; 21c', 21d') to an overhead conveyor, the transfer device (1) comprising: a helical conveyor (11, 11') forming a conveying section (F) for the holders (21, 21a-21e; 21a'-21f') with a conveying portion (FF) and a transfer portion (FU), wherein the conveying section (F) in the conveying portion (FF) following a linear path and in the transfer portion (FU) following a transversely curved path superimposed on the linear path, wherein the helical conveyor (11, 11') ends in the transfer portion (FU) in an eccentrically arranged guide tongue (111), which has a tapering cross-section as compared to the cross-section of the helical conveyor (11, 11') in the conveying portion;
  ii) providing an overhead conveyor (3, 3') with a plurality of transport units (31, 31', 31a', 31b') for the product carriers (2a-2e; 2a'-2f'), wherein the transport units (31, 31', 31a', 31b') comprise engagement means (311) for the holders (21, 21a-21e; 21a'-21f') of the product carriers (2a-2e; 2a'-2f');
  iii) providing a transfer region (T, T'), in which the product carriers (2a-2e; 2a'-2f') are transferred from the transfer device (1) to the overhead conveyor (3, 3');
  iv) conveying the holders (21, 21a-21e; 21a'-21f') of the product carriers (2a-2e; 2a'-2f') on the helical conveyor (11, 11') of the transfer device (1);
  v) transferring the product carriers (2a-2e; 2c', 2d') from the transfer device (1) to the overhead conveyor (3, 3') in the transfer region (T, T'), wherein the holders (21, 21a-21e; 21c', 21d') are conveyed in a controlled manner during the transfer into the engagement means (311) of a transport unit (31; 31', 31a', 31b'), wherein the holders (21, 21a-21e; 21a'-21f') lie in the transfer portion (FU) of the helical conveyor (11, 11') on a support point (AP) on the helical conveyor (11, 11'), which diverges from the vertical plane defined by the longitudinal axis of the helical conveyor (11, 11'), such that a portion (211) of the holders (21, 21a-21e; 21a'-21f') projects in a transverse direction (A), orientated towards the overhead conveyor (3, 3'), beyond the cross-sectional area of the helical conveyor (11, 11').

19. The method according to claim 18, wherein the holders (21, 21a-21e; 21c', 21d') are conveyed in a controlled manner during the transfer in such a way that a portion (211) of the holders (21, 21a-21e; 21c', 21d') projects in each case into the engagement means (311) of a transport unit (31; 31', 31a', 31b'), before the holders (21, 21a-21e; 21c', 21d') leaves the transfer device (1) and is transferred to the overhead conveyor (3, 3').

* * * * *